United States Patent [19]

Naimpally

[11] Patent Number: 4,665,439
[45] Date of Patent: May 12, 1987

[54] PIECEWISE RECURSIVE VERTICAL FILTER FOR PIP FEATURE

[75] Inventor: Saiprasad V. Naimpally, Knoxville, Tenn.

[73] Assignee: North American Philips Consumer Electronics Corp., Knoxville, Tenn.

[21] Appl. No.: 871,014

[22] Filed: Jun. 5, 1986

[51] Int. Cl.$^4$ .................. H04N 5/272; H04N 7/12
[52] U.S. Cl. .................. 358/183; 358/138; 358/260; 358/181
[58] Field of Search ............... 358/183, 181, 166, 138, 358/160, 22, 260

[56] References Cited

U.S. PATENT DOCUMENTS

| | | | |
|---|---|---|---|
| 4,155,093 | 5/1979 | Lux | 358/138 |
| 4,249,212 | 2/1981 | Ito | 358/183 |
| 4,551,753 | 11/1985 | Nishizawa | 358/138 |
| 4,563,703 | 1/1986 | Taylor | 358/22 |

Primary Examiner—Tommy P. Chin
Attorney, Agent, or Firm—Thomas A. Briody; William J. Streeter; Marianne R. Rich

[57] ABSTRACT

Only every third line is utilized for the picture-in-picture feature. Each third line is a function of weighted contributions from the present line and the two previous lines. The third lines are weighted by a factor 1−2a, while the remaining two lines will each be weighted by a factor a. The circuit for implementing this equation consists of a first and second multiplier multiplying each of the incoming filter signals by a and 1−2a, respectively. Throughout the middle line, the (1−2a) multiplied input is applied to one input of a summing circuit, while for the remaining lines the same summing circuit input is applied to the terminal furnishing the input signal multiplied by a. The second summing input receives a "0" during the lines following the valid line, and the output of a delay unit during the remaining two lines. The input to the delay unit is connected to the summing circuit output. The desired output signals, properly weighted, are available every third line at the summing circuit output.

7 Claims, 4 Drawing Figures

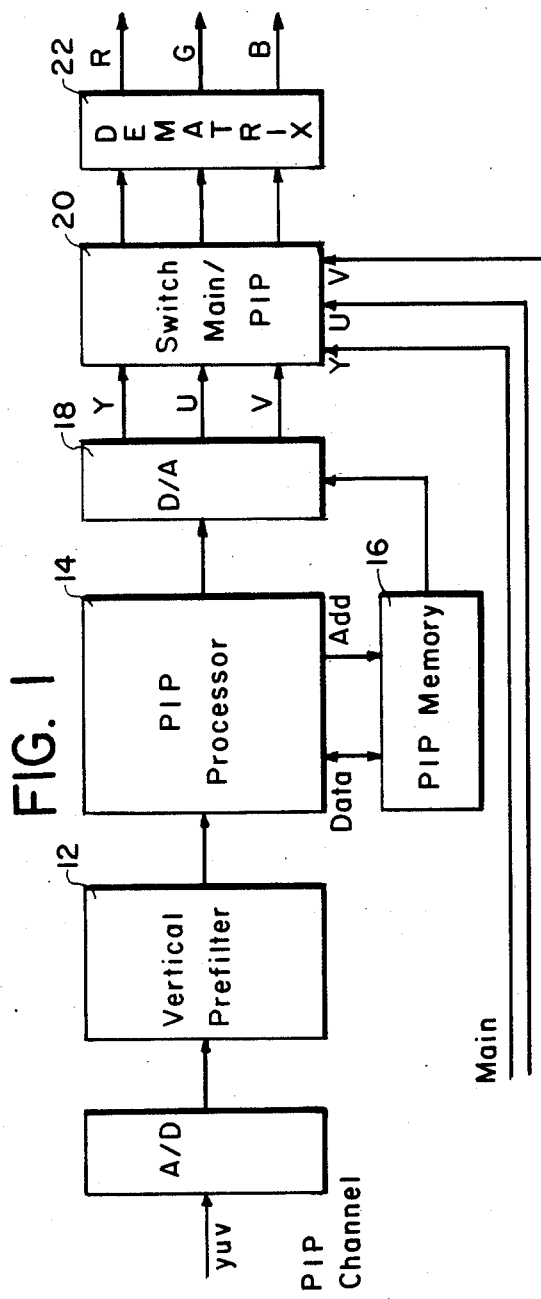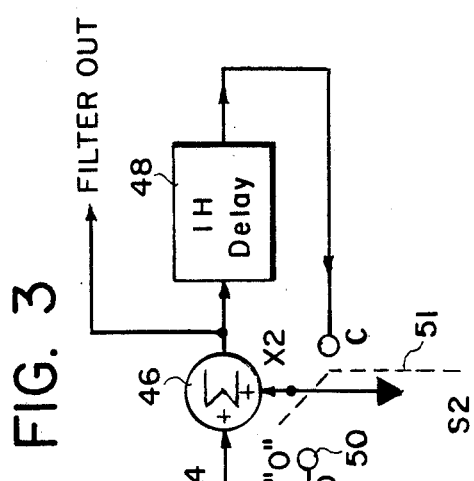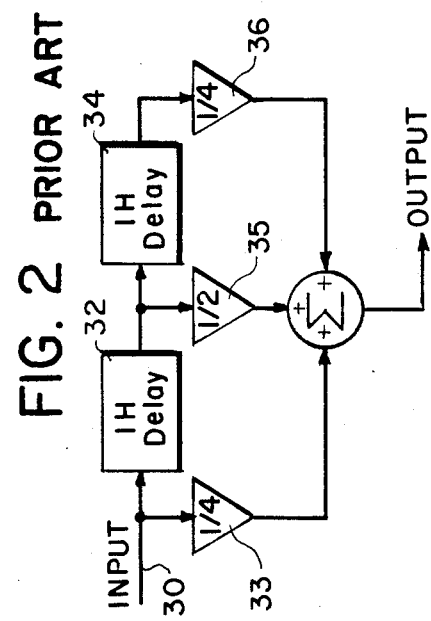

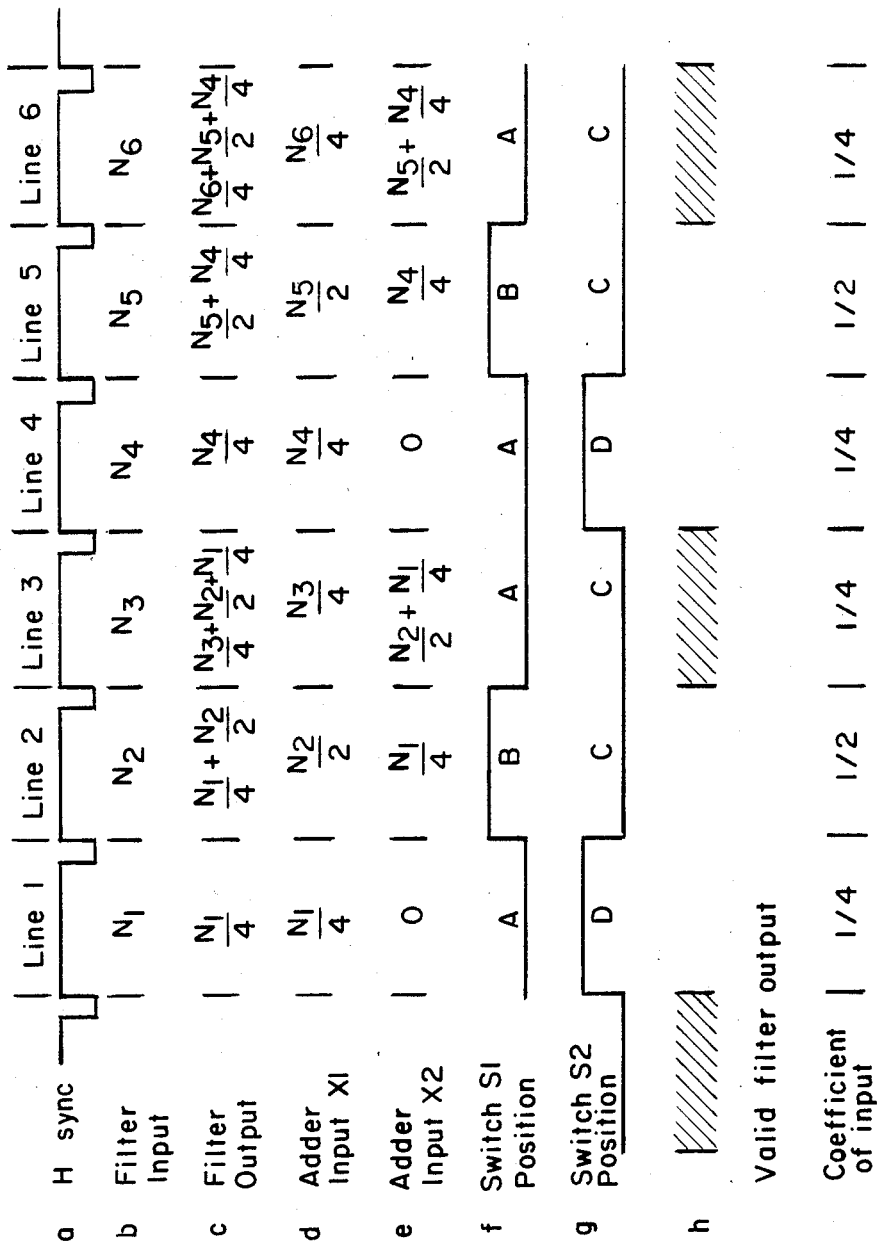

PIECEWISE RECURSIVE VERTICAL FILTER FOR PIP FEATURE

BACKGROUND OF THE INVENTION

1. Field of the Invention

The present invention relates to television receivers and, more particularly, to television receivers having a picture-in-picture (PIP) feature, that is receivers in which a small, compressed version of a video signal is displayed within a larger "main" picture.

2. Description of the Prior Art

In television receivers having a PIP feature, two channels are provided, namely a main channel and a PIP channel. The main channel is a conventional television channel, receiving the incoming composite television signal and furnishing a luminance and two color difference signals. The PIP channel also receives the composite television signal, but it is processed digitally. A digital, reduced version of the received picture is stored in a memory. It is read out from memory, the read-out data is converted back to analog form, and the resulting color difference and luminance signals are combined with the corresponding signals from the main channel under control of a synchronous switching circuit. The combined signals are then converted to the red, blue and green signals required to control the display.

A vertical prefilter is provided to process the digital television signal before it is stored in memory. Since the picture is to be displayed in a much smaller area than the main picture, some sampling is required. However, sampling at less than the Nyquist frequency introduces low frequency beats. Also, the compressed signal, if not preprocessed, may be subject to line flicker and aliasing.

A filter is therefore provided which processes the output of the analog/digital converter. The filter is essentially a lowpass filter which reduces the high vertical frequencies in the signal before it is subsampled in a PIP processor connected in cascade with the filter. The PIP processor accepts only every third line for storage in the PIP memory.

SUMMARY OF THE INVENTION

It is an object of the present invention to provide a vertical filter which carries out the low frequency filtering function reliably and with a minimum of components.

BRIEF DESCRIPTION OF THE DRAWING

The features of the present invention are set forth with particularity in the appended claims. The invention, together with further objects and advantages thereof, may best be understood by reference to the following description taken in conjunction with the accompanying drawing, in the several figures of which like reference numerals identify like elements and of which:

FIG. 1 is a schematic block diagram of the picture-in-picture (PIP) channel in a television receiver, and its interconnection to the main channel;

FIG. 2 is a schematic block diagram illustrating a vertical filter having valid output samples on every line;

FIG. 3 is a schematic block diagram of a generalized piecewise recursive filter for a 3:1 reduction ratio according to the present invention; and FIG. 4 is a timing diagram illustrating the operation of the filter of FIG. 3 for $a=\frac{1}{4}$.

DESCRIPTION OF THE PREFERRED EMBODIMENTS

In a picture-in-picture (PIP) television receiver, a small compressed version of one picture is displayed inset within a larger (main) picture. The second picture may be received on a different channel or may be derived from another input device such as a video cassette recorder. For this purpose, a field of a reduced version of the PIP video signal is stored in a memory and is read out in synchronism with the main video signal.

This is illustrated in FIG. 1. There, the color difference and luminance signals of the PIP channel are applied to an analog-digital converter 10. The output of the analog-digital converter is applied to a vertical prefilter 12 in which the digitalized video portion of the PIP signals is subjected to vertical lowpass filtering. The lowpass filtering is required since the PIP video signal is subsampled in PIP processor 14 to create the smaller picture. Specifically every third line of the incoming PIP video is stored by a processor 14 in a PIP memory 16. Read-out from PIP memory 16 takes place in synchronism with the main channel. The read out data is applied to a digital analog converter 18. The analog luminance and color difference signals of the PIP channel are combined with the corresponding signals in the main channel by a switch 20 also synchronized to the main channel. The output of switch 20 is applied to a demultiplexer 22 which furnishes the standard red, green blue signals as well as the luminance signal for controlling the display tube.

Since the present invention is concerned only with the processing of the digital PIP video signals by vertical prefilter 12, no further description of the remaining blocks of FIG. 1 is required. These are, in any case, well known to those skilled in the art.

For the picture-in-picture according to the present invention, processor 14 selects every third line for storage into PIP memory 16.

A lowpass vertical filter every output line of which is constituted by pixels having pixel values which are a function of weighted contributions from the then-present line and two previous lines may be represented by the following difference equation:

$$y(n^T h) = ax(n^T h) + (1-2a)x((n-1)^T h) + ax((n-2)^T h); \quad 0 \leq a < 1.$$

This equation can be implemented as illustrated in FIG. 2. In this figure, the video signal output of analog-digital converter 10 is received at an input 30. Input 30 is connected on the one hand to a one horizontal line (1H) delay 32 and, on the other hand, to a multiplier 33 which multiplies it by the factor a. The output of delay unit 32 is applied to a further delay unit 34 which is also a one horizontal line delay unit. It is also applied to a second multiplier 35 which multiplies it by a factor (1−2a). The output of delay unit 34 is applied to a third multiplier 36 which multiplies it by a factor a. The output of the three multiplier units are added together in a summing stage 38 which consists of at least two full adder stages.

Delay units 32 and 34 may be random access memories with associated control logic. Alternatively, synchronized shift registers having a number of places corresponding to the desired delay may be used.

The implementation of difference equation 1 illustrated in FIG. 2 yields a correct output for every line, but requires two delay units, three multipliers and two full adder stages.

The present invention takes into consideration that a valid output of the vertical prefilter in the PIP channel need only occur every third line, since only every third line will be sampled by processor 14 for storage in memory 16. Implementation of equation 1 in accordance with the present invention is illustrated in FIG. 3. The video signal input furnished by analog-digital converter 10 of FIG. 1 is applied simultaneously to a first multiplier 40 and a second multiplier 42. A switch 44 alternately selects the output of multiplier 40 or that of multiplier 42 for application to the first input of an adder stage 46. The output of adder 46 constitutes the filter output and is also applied to a 1H delay circuit 48. The output of delay unit 48 is applied, alternately with a "0" input furnished at a terminal 50, to the second input of adder 46 by a switch 51.

It should be noted that switch 44 and multiplier 42 can be eliminated where $(1-2a)=a$, namely $a=\frac{1}{3}$.

The operation of the circuit of FIG. 3, for $a=\frac{1}{4}$ and $1-2a=\frac{1}{2}$ is best described with reference also to FIGS. 4 and 5. In FIG. 4, the timing of the filter output, the first and second adder inputs, and the position of the first and second switches is illustrated in respective ones of lines b through g as timed relative to the occurrence of horizontal synchronization signals illustrated in line a. Thus, during the first line interval, the filter input is $N_1$, where $N_1$ symbolizes the sequential input of all pixels together constituting line 1. Switch 44 is in position A, so that the filter output as well as the first adder input during the first line interval is $N_1/4$. Switch 51 is in the D position so that adder 46 receives a "0" at its second input.

In line 2, a sequence of pixels symbolized by $N_2$ is received. Switch 44 is in the B position so that the signal received at the first input of adder 46 is $N_2/2$. The output of delay unit 48 is $N_1/4$. Since switch 51 is in the C position, values $N_1/4$ are applied to the second input of adder 46. The filter output is thus $N_1/4+N_2/2$.

For line 3, the received input is $N_3$. Switch S1 is back in the A position so that the signal input to the first input of adder 46 is $N_3/4$. The output of delay unit 48 is $N_1/4+N_2/2$. This is applied to the second input of adder 46, since switch 51 is in the C position. The output of adder 46, as well as the filter output and the input to delay unit 48, is therefore $$\frac{N_3}{4}+\frac{N_2}{2}+\frac{N_1}{4}.$$

At this point switch 51 returns to the D position and the cycle which has been described for $N_1$, $N_2$ and $N_3$ repeats for $N_4$, $N_5$ and $N_6$.

It will be noted that the filter of FIG. 3 operates in a piecewise recursive fashion. Over an interval of three lines the filter operates in the recursive manner, with the previous line filter output being added to a scaled version of the input. After the third line, the filter "resets" and starts a new recursive cycle of yet another three lines. It will be noted from the table of FIG. 4 that, for lines 3 and 6 (and of course lines 9, 12, etc.) the filter of FIG. 3 yields the exact outputs required by difference equation 1 for $a=\frac{1}{4}$. The same results will be obtained for other fractional values of a. Thus the apparatus of the present invention will, for every third line, yield exactly the same output as the circuit illustrated in FIG. 2. However, the circuit of FIG. 3 requires only one delay unit, two multipliers, two switches and one full adder while, as previously stated, the circuit of FIG. 2 requires two delay units, three multipliers and at least two full adder stages. In both cases, the delay unit can be a shift register having a number of stages equal to the number of pixels per line or, alternatively, may be a random access memory. However, only a single line memory is required.

The present invention thus gives exactly the same results for a picture-in-picture application utilizing only every third line as does a straightforward implementation of the filtering equation, while requiring considerably less hardware. It is thus more practical and cost effective for consumer television products.

While the invention has been described with reference to a specific embodiment, it will be obvious to those skilled in the art that changes and modifications may be made which are readily apparent to one skilled in the art and are to be included in the present invention as set forth in the following claims.

I claim:

1. In television filter apparatus receiving sequential pixel value signals during successive line intervals, apparatus for creating filtered signals comprising predetermined combinations of weighted vertically adjacent pixel signals during every $n^{th}$ one of said successive line intervals, comprising:
   means for multiplying each of said received pixel signals by a weighting constant, thereby creating weighted pixel signals;
   summing means having a first summing input, a second summing input and a summing output for furnishing summing output signals corresponding to the sum of signals applied at said first and second summing inputs;
   means for connecting said first summing input to said multiplying means;
   delay means connected to said summing output for delaying said summing output signals by a line interval, thereby creating delayed signals;
   means for furnishing a "0" signal; and
   first switch means connected to said delay means for applying said "0" signal to said second adding input during line intervals immediately following each of said $n^{th}$ ones of said successive line intervals, and applying said delayed signals to said second summing input during the remainder of said successive line intervals.

2. Apparatus as claimed in claim 1, wherein each of said weighted vertically adjacent pixel signals is weighted by a multiplier a;
   and wherein said first predetermined constant is a.

3. Apparatus as set forth in claim 2, wherein $a=\frac{1}{3}$.

4. Apparatus as claimed in claim 1, wherein every $n^{th}$ one of said successive line intervals is every third one of said successive line intervals;
   wherein said multiplying means comprises means for multiplying selected ones of said received pixel signals by a first weighting constant, and the remainder of said received pixel signals by a second weighting constant;
   said means for connecting further comprising second switch means for selectively applying a received pixel signal multiplied by said first or said second weighting constant to said first summing input.

5. Apparatus as claimed in claim 4, wherein said first weighting constant equal a, and said second weighting constant $=(1-2a)$.

6. Apparatus as claimed in claim 5, wherein $a=\frac{1}{4}$.

7. Method for creating filtered signals comprising predetermined combinations of weighted vertically adjacent pixel signals during every $n^{th}$ one of successive line intervals of a received television signal comprising the steps of:

multiplying each received pixel signal by a weighting constant, thereby creating a weighted pixel signal;

adding each of said weighted pixel signals to a "0" signal during the line interval immediately following each of said $n^{th}$ ones of said successive line intervals thereby creating initial summing output signals;

during line intervals following each of said $n^{th}$ ones of said successive lines intervals, delaying said summing output signals by a 1H delay time, and adding the so-delayed sum signals to said weighted pixel signals.

* * * * *